United States Patent (10) Patent No.: US 11,668,140 B2
Church et al. (45) Date of Patent: Jun. 6, 2023

(54) ROLLER TOOL

(71) Applicant: KASEUM HOLDINGS LIMITED, Aberdeen (GB)

(72) Inventors: Paul Andrew Church, Aberdeen (GB); Peter Alan Joiner, Aberdeen (GB); Andrew John Elrick, Peterhead (GB); Iain Morrison Macleod, Newmachar (GB)

(73) Assignee: IMPACT SELECTOR LIMITED, Aberdeen (GB)

( * ) Notice: Subject to any disclaimer, the term of this patent is extended or adjusted under 35 U.S.C. 154(b) by 274 days.

(21) Appl. No.: 16/976,329

(22) PCT Filed: Feb. 26, 2019

(86) PCT No.: PCT/GB2019/050519
§ 371 (c)(1),
(2) Date: Aug. 27, 2020

(87) PCT Pub. No.: WO2019/166788
PCT Pub. Date: Sep. 6, 2019

(65) Prior Publication Data
US 2021/0002966 A1 Jan. 7, 2021

(30) Foreign Application Priority Data
Feb. 28, 2018 (GB) .................................. 1803284

(51) Int. Cl.
E21B 17/10 (2006.01)
E21B 23/00 (2006.01)
(Continued)

(52) U.S. Cl.
CPC ........ E21B 17/1057 (2013.01); E21B 23/001 (2020.05); E21B 4/18 (2013.01); E21B 23/14 (2013.01); F16C 19/364 (2013.01)

(58) Field of Classification Search
CPC ...... E21B 17/1057; E21B 23/001; E21B 4/18; E21B 23/14
See application file for complete search history.

(56) References Cited

U.S. PATENT DOCUMENTS 5,522,467 A    6/1996 Stevens et al.
8,733,455 B2 * 5/2014 Shaikh ................ E21B 17/1057
                                              166/380
(Continued)

FOREIGN PATENT DOCUMENTS

CA       2219426      10/1996
GB       2430220 A    3/2007
(Continued)

OTHER PUBLICATIONS

Combined Search and Examination Report under Sections 17 and 18(3) dated Mar. 21, 2019 issued in GB1902528.7.
(Continued)

Primary Examiner — Robert E Fuller
Assistant Examiner — Neel Girish Patel
(74) Attorney, Agent, or Firm — Boisbrun Hofman, PLLC

(57) ABSTRACT

A roller tool 1 that can be connected into a string for deployment into an oil or gas well includes at least two rollers or wheels 10 located on each side of the roller tool 1, with axes of rotation that are perpendicular to the axis of the roller tool 1. The roller tool further includes at least two interconnecting tubular portions, where one tubular portion 41 comprises a mandrel 45 that connects to another tubular portion 42. An annular hub 20 is fitted over the mandrel 45 and the rollers 10 are connected onto the hub 20. The tubular portions 41, 42 comprise circumferential sleeve sections 56a, 56b that partially extend over the rollers 10 and resist detachment of the rollers 10 from the roller tool 1. The roller tool 1 can aid passage of a string through a well by holding
(Continued)

the string away from the walls of the well and reducing frictional contact.

33 Claims, 11 Drawing Sheets

(51) Int. Cl.
*F16C 19/36* (2006.01)
*E21B 4/18* (2006.01)
*E21B 23/14* (2006.01)

(56) References Cited

U.S. PATENT DOCUMENTS

| | | | |
|---|---|---|---|
| 2007/0067299 A1 | 3/2007 | Kozam et al. | |
| 2008/0164018 A1* | 7/2008 | Hall | E21B 17/1057 166/241.1 |
| 2009/0003974 A1* | 1/2009 | McNay | E21B 17/1057 166/241.1 |
| 2012/0145380 A1* | 6/2012 | Draper | E21B 17/05 166/241.3 |
| 2012/0255744 A1* | 10/2012 | Shaikh | E21B 17/1057 166/241.1 |
| 2015/0027729 A1* | 1/2015 | Hradecky | E21B 23/14 166/241.1 |
| 2015/0047829 A1* | 2/2015 | Millet | E21B 17/1014 166/206 |
| 2018/0119498 A1* | 5/2018 | Christie | E21B 17/1064 |
| 2018/0135359 A1* | 5/2018 | Hradecky | E21B 23/14 |
| 2019/0106947 A1* | 4/2019 | Goff | E21B 17/1057 |

FOREIGN PATENT DOCUMENTS

| | | |
|---|---|---|
| WO | 1995011368 A1 | 4/1995 |
| WO | 2001027434 A2 | 4/2001 |
| WO | 2005116387 A2 | 12/2005 |
| WO | 2016170356 A1 | 10/2016 |

OTHER PUBLICATIONS

Search Report under Section 17(5) dated Jun. 29, 2018 issued in GB1803284.7.
Int'l Search Report & Written Opinion (PCT/GB2019/050519), dated May 28, 2019.
Combined Search & Examination Report (GB 1902528.7), dated Mar. 21, 2019.

* cited by examiner

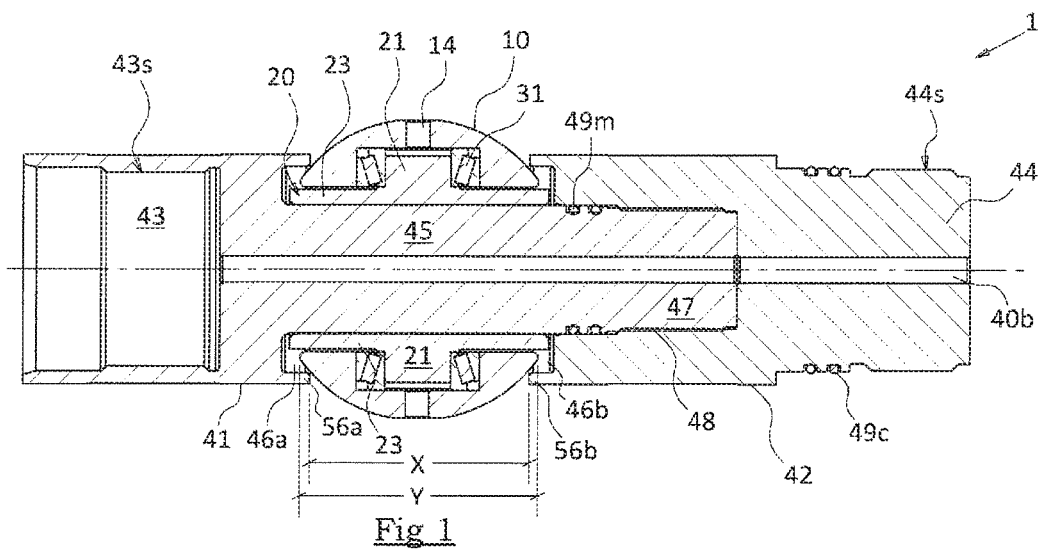
Fig 1
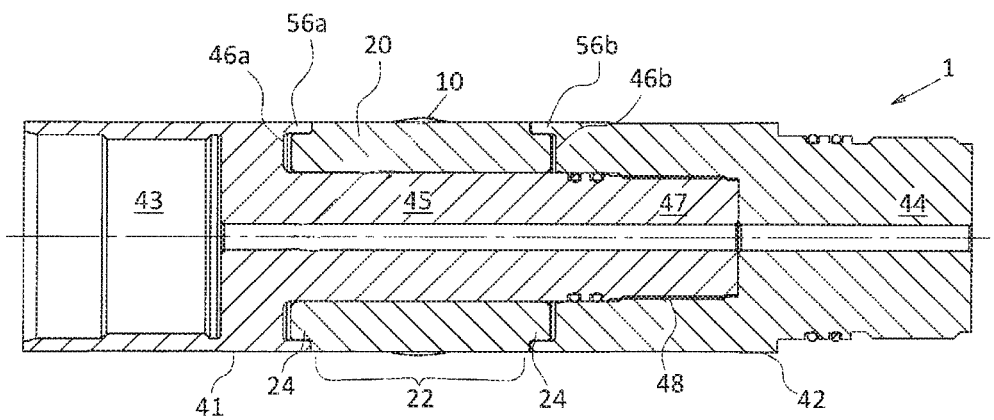
Fig 2
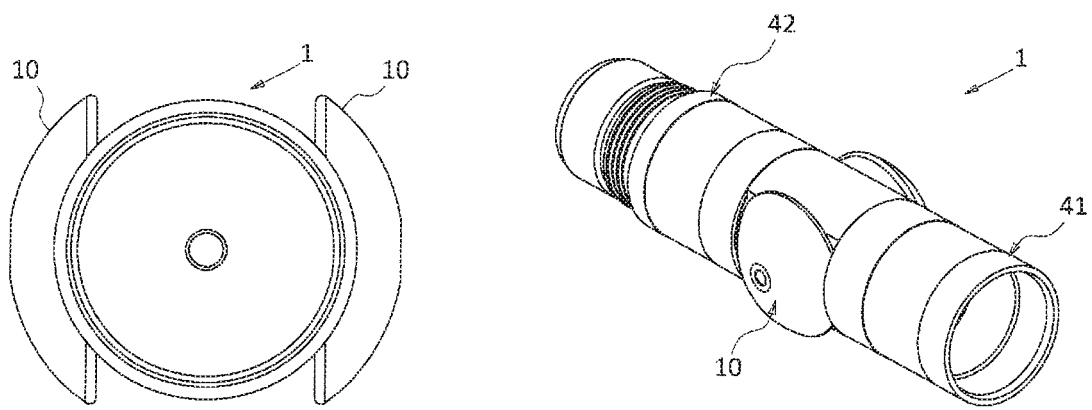
Fig 3
Fig 4

C-C

D-D

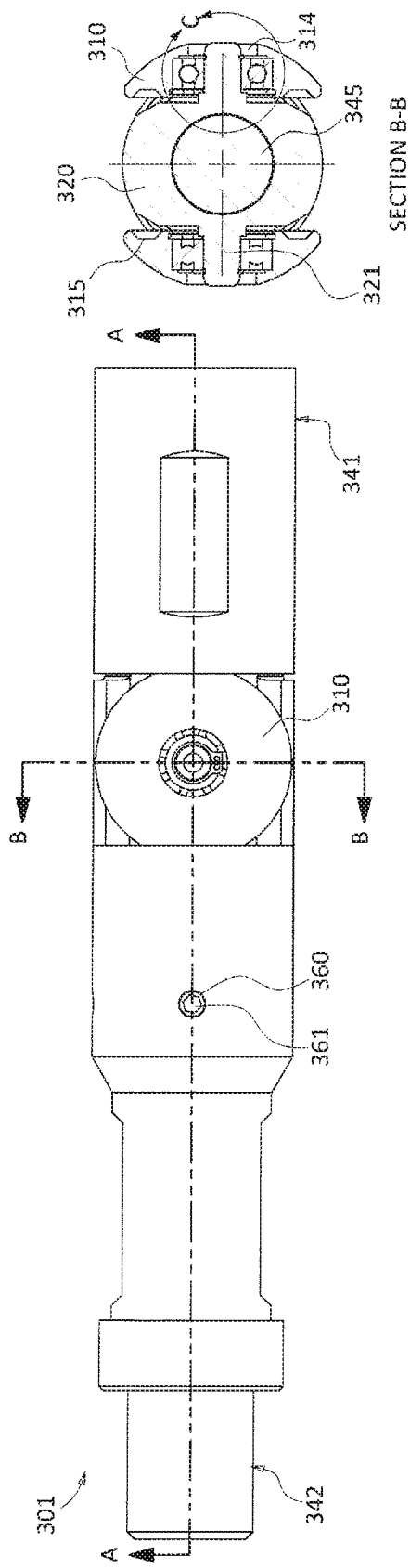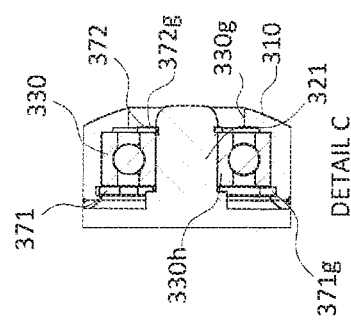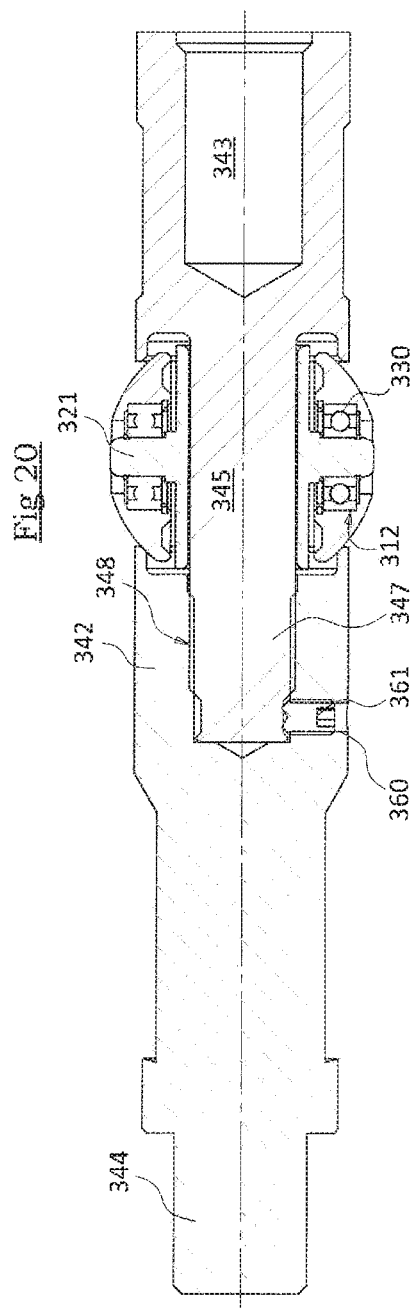

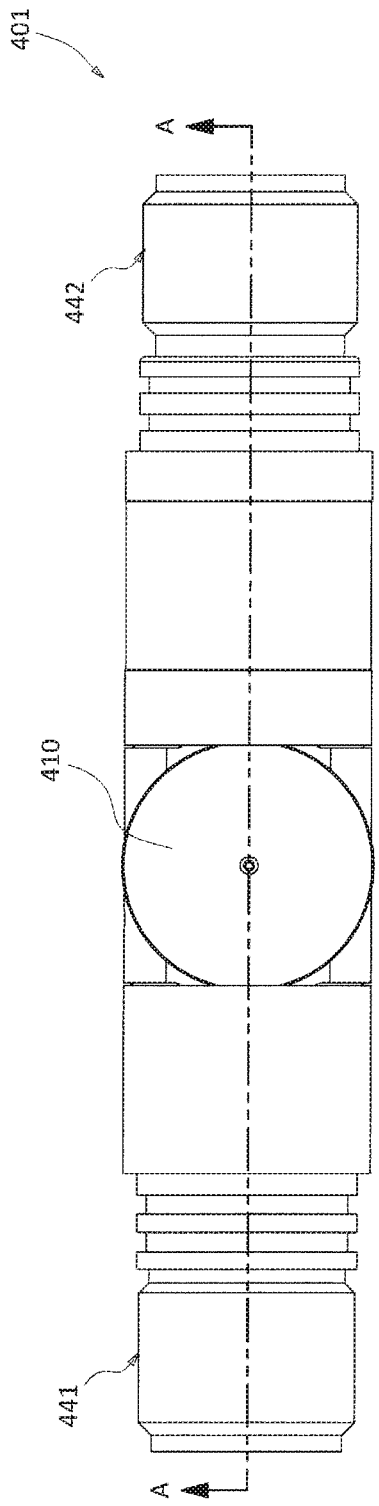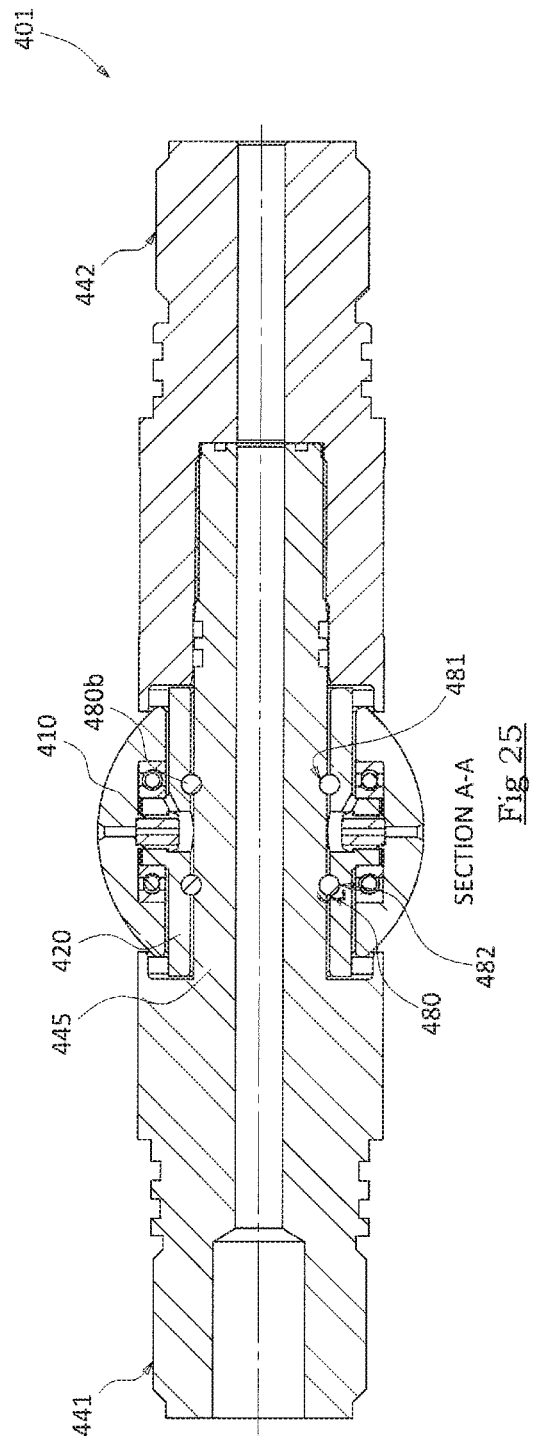

ROLLER TOOL

The present invention relates to a roller tool, in particular a roller tool for use within an oil or gas well. More particularly, the invention relates to a roller tool suitable for use with a downhole sub.

BACKGROUND OF THE INVENTION

Deployment of a downhole tool string (whether that be on a drill pipe, coiled tubing, wireline, slickline, workstring or other means or conveyance), particularly in deviated wells (into an oil or gas well or recovery therefrom) may be facilitated by attachment of one or more roller tools within the string. The roller tool(s) hold the string away from the sides of the wellbore to reduce interference from debris or other inconsistencies in the walls of the bore that may lead to the string bellying out on the wall of the wellbore. Contact with the wall may lead to damage to the string, or jamming of the string downhole that may require at least partial retraction of the string before insertion is attempted again. Moreover, the roller tool(s) reduce or minimise the friction that would otherwise occur between the string and the wellbore in order to ease deployment and or recovery of the string into/from the wellbore.

Present roller tools can comprise several components, e.g. wheels, that are fixed on a body or housing of the roller tool by screws, bolts, or similar fixings. The more components there are within these roller tools, the higher the risk of such components or parts falling off within the downhole environment, for example as a result of a ballistic event downhole. Any foreign objects such as fixings or wheels lost within the well can lead to catastrophic failure requiring immediate intervention at great risk and cost to the operator.

SUMMARY OF THE INVENTION

According to the present invention, there is provided a roller tool for use in an oil or gas well, the roller tool comprising:
  at least two rollers disposed on the roller tool; and
  at least two sleeves axially spaced apart, wherein an outer circumferential portion of each roller is eclipsed by the at least two sleeves such that in use each roller may rotate while being restrained from detachment from the roller tool by the sleeves; and
  wherein the axis of rotation of each roller is perpendicular to the longitudinal axis of the roller tool.

Optionally the roller tool further comprises first and second tubular portions that are optionally adapted to interconnect and the sleeves may be mounted, formed, fixed or otherwise secured on each of the first and second tubular portions. Optionally the first tubular portion comprises a box connector on one end that is suitable for connection to a pin connector on a section of a string. Optionally the first tubular portion further comprises a co-axial longitudinally extending mandrel. Optionally the mandrel comprises a male connector axially spaced from the box connector. Optionally the mandrel has a smaller diameter than the box connector, and the first tubular portion thereby steps down in diameter from the box connector to the mandrel. Optionally an annular recess is formed within an outer wall of the stepped portion of the first tubular portion and preferably, each sleeve comprises at least one recess associated therewith. Preferably, the annular recess is formed in an inner most section of an end portion of each connector and more preferably the associated sleeve forms a shroud over the recess.

More preferably, the at least two sleeves are arranged such that the closest distance between them is shorter than the greatest diameter of the rollers, such that the rollers are retained captive within the recess by the sleeve(s) in the event of the rollers becoming detached from an associated bearing assembly. Optionally the outer circumferential portion of each roller is spaced apart from each sleeve in normal use, optionally thereby providing clearance for each roller to rotate. Optionally in normal use the roller and the sleeve do not contact one another. Optionally the clearance is as minimal as possible in order to maintain the compactness of the roller tool.

Optionally the mandrel comprises a throughbore, for example for passage of fluid or equipment such as electrical feedthrough and/or for detonating cord to pass therethrough. Optionally the mandrel is solid and does not comprise a throughbore.

Optionally the second tubular portion comprises a pin connector at one end that is suitable for connection to a box connector on a section of string. Optionally the second tubular portion further comprises a female connector axially spaced from the pin connector. Optionally the female connector is adapted to receive the male connector of the mandrel of the first tubular portion. Optionally the female connector may comprise at least one radial orifice, optionally aligned to be perpendicular to the thread of the pin connector, extending from the female connector's outer surface through the wall of the female connector. Optionally the orifice may also comprise a threaded portion. Optionally the orifice may be configured to receive a threaded fixing, for example a screw such as a set screw. Optionally after the male connector of the mandrel is received within the pin connector and the connection is made up, the threaded fixing may be inserted into the orifice and screwed into the orifice. Optionally the threaded fixing engages with the threaded portion of the male connector of the mandrel. Advantageously the engagement of the threaded fixing with the threaded portion of the male connector acts to resist backing off of the threaded connection between the male connector and the pin connector, thus resisting separation of the two components.

Alternatively, or additionally, the male connector portion of the mandrel may comprise one or more seals, for example annular seals such as o-rings, positioned within grooves (optionally annular grooves) behind the threaded portion of the male connector (i.e. when the connection is made up, the seals are positioned nearer to the centre of the mandrel than the connected end of the male connector). Optionally the male connector may comprise at least one further seal on its end face, optionally an annular seal, optionally positioned within a ringed groove on the face of the male connector. Optionally the combination of the annular seals and the face seal(s) creates an atmospheric chamber between the seals, corresponding to the threaded connection. Advantageously, in use, when the roller tool is exposed to high pressures such as those found in a downhole environment, the female connector is naturally compressed towards the male connector due to the pressure difference between the atmospheric chamber and the external pressure in the well. This acts to resist any relative movement of the threads. When the roller tool is retracted to surface, however, the pressure differential between the atmospheric chamber and the external pressure returns to zero and the first and second tubular portions can be separated.

Optionally the second tubular portion comprises an annular recess formed in an outer wall of the second tubular portion, optionally around the female connector. Optionally the annular recesses of the first and second tubular portions face each other. Optionally the annular recesses are axially spaced from each other when the roller tool is made up.

Optionally when the male connector of the first tubular portion is engaged within the female connector of the second tubular portion, a section of the mandrel extends between the box and pin connectors.

Optionally the roller tool further comprises a hub, optionally an annular hub, for example a tubular portion which is permitted to rotate with respect to the first and second tubular portion around the longitudinal central axis of the first and second tubular portions. Optionally the hub comprises a central bore into which the mandrel may be inserted prior to the interconnection of the male and female connectors of the first and second tubular portions. Optionally the hub encircles at least a portion of the mandrel.

Optionally the hub has a first outer diameter that is equal to the outer diameter of the outer walls of the first and second tubular portions. Optionally the hub has a second outer diameter that is smaller than the first outer diameter. Optionally the hub comprises at least two partially circumferential sections having a portion with the first outer diameter and a portion with the second outer diameter. Optionally the partially circumferential sections comprise a central section having the first outer diameter. Optionally the central section is flanked by two shoulders having the second outer diameter. Optionally the shoulders are configured to fit within the annular recesses formed in the outer walls of the first and second tubular portions when the roller tool is made up. Optionally the shoulders of the hub have a slight clearance within the annular recesses. Optionally the annular recesses and the shoulders act to restrain the hub in a co-axial arrangement within the roller tool, restricting movement in a lateral direction. Optionally the hub remains able to rotate around the mandrel when the roller tool is made up.

Optionally the roller tool comprises at least one annular race of bearings disposed between the outer surface of the mandrel and the inner surface of the hub. Optionally the bearings are ball bearings, or alternatively they may be cylindrical, and the like. Optionally the hub and the mandrel comprise complementary grooved portions into which the bearings may be positioned. Optionally the grooves allow the bearings to be positioned between the hub and the mandrel without necessarily changing the general clearance between the hub and the mandrel, or between the hub and any other component of the roller tool. The addition of the bearings enhances the rotation of the hub around the mandrel, and therefore around the longitudinal axis of the roller tool. This may be advantageous in situations where, for example, a downhole tool needs to be rotated within the well to achieve the desired position (e.g. deployment of perforating guns downhole and orientation of the guns).

Optionally, prior to the bearings being inserted into the at least one annular race of bearings, the hub is positioned on the mandrel. Optionally the hub comprises at least one aperture that is aligned with the grooves in the hub and mandrel that will hold the bearings. Optionally the bearings are then inserted into the aperture(s) until the at least one race is filled, or substantially filled, or optionally comprises sufficient bearings to achieve the enhanced rotation of the hub relative to the mandrel. Optionally in order to prevent the bearings returning through the apertures, a pin may be inserted between the race of bearings and the apertures. Optionally the pin is inserted into a wall of the hub from an end of the hub. Optionally for ease of insertion the pin may be cylindrical, but alternative shapes would also work.

Optionally the pin further includes a head section with an enlarged cross-section relative to the rest of the body of the pin, at one end. Optionally the head section may engage with a shoulder formed in the hub. Optionally the engagement between the head section and the shoulder restricts movement of the pin in one direction. Optionally the movement of the pin in the other direction is restricted by one of the first or second tubular portions when the connection is made up.

Optionally the hub comprises at least two flat portions, optionally longitudinally extending flat portions. Optionally the flat portions are symmetrically arranged, for example on opposing sides of the hub. Optionally the rollers are mounted onto the flat portions of the hub.

Optionally each flat portion of the hub comprises at least one projection, optionally a cylindrical projection, optionally integrally formed with the hub. Optionally the projection extends perpendicularly from the hub. Optionally the projections are symmetrically arranged, for example on directly opposing sides of the hub.

Optionally, the roller tool further comprises at least two bearing assemblies, wherein each bearing assembly is typically annular and preferably comprises a central aperture and an annular housing within which one or more bearings are preferably held. The bearings are preferably tapered roller bearings comprising frusto-conically shaped roller bearings. Each roller is preferably fitted in use to the hub by means of a respective bearing assembly.

Optionally each bearing assembly is annular. Optionally each bearing assembly comprises a central aperture. Optionally the bearings of the bearing assembly are held within an annular housing. Optionally the central portion of the annular housing defines the central aperture. Optionally the outer portion of the annular housing is free to rotate around the bearings. Optionally the bearings are taper bearings.

Optionally the projections on the hub are configured to engage with the central aperture of the bearing assemblies. Optionally when the bearing assemblies are positioned onto the projections, the outer end of each projection is flush with an outer surface of the bearing assembly. Optionally each bearing assembly fits over a projection in a tightly fitting arrangement that is adapted to hold the bearing assembly in place. Optionally at least one fixing device can be used to further secure the bearing assembly in position.

Optionally each roller is fitted over a bearing assembly in a press- or interference-fit engagement. Optionally each roller comprises a central orifice which is configured to receive the bearing assembly. Optionally, at least one fixing may be used to even more securely connect each roller e.g. over the bearing assembly.

For example, a groove may be formed within the wall of the central orifice of the roller which is configured to receive a fixing device, for example a circlip. A further space may be machined out of the central orifice to receive the bearing assembly. Optionally the bearing assembly may be positioned within the roller before being placed onto the hub. Optionally after the bearing assembly is positioned within the central orifice of the roller, the fixing device may then be inserted into the groove. This arrangement advantageously reinforces the engagement between the roller and the bearing assembly and resists disconnection of one from the other.

Once the fixing device is positioned within the groove optionally the roller and bearing assembly are positioned onto a projection of the hub. Optionally the projection of the hub may comprise sections with varied diameters to receive the fixing device and bearing assembly.

Optionally the projection of the hub may comprise a groove configured to receive a further fixing device, for example a second circlip. Optionally the second fixing device may be installed at the opposite side of the bearing assembly to the first fixing device. This offers the advantage that the connection between the roller and the hub is reinforced.

Optionally at least a portion of the outer circumferential edges of the rollers extend into the annular recesses of the first and second tubular portions. Optionally the outer walls (and more preferably the sleeves) of the first and second tubular portions thus extend partially over the edges of the rollers when the roller tool is made up.

Optionally the outermost walls (e.g. the sleeves) of the annular recesses of both the first and second tubular portions do not make contact with the roller in ordinary use, and therefore the rollers may rotate freely. As the outer walls of the first and second tubular portions extend partially over the rollers, should a roller become disconnected from the hub during use, the roller is nevertheless held in place by the outer walls (e.g. the sleeves) of the first and second tubular portions. This offers the advantage that as the rollers are held by the sleeves of the first and second tubular portions, they will stay contained within the recesses as part of the roller tool even if disconnected from the hub/bearing assembly. The risk of the rollers completely detaching and falling into the well is thus significantly reduced.

Optionally in a first example of the rollers, each roller is in the shape of a spherical cap, with a flat side that is directed towards the hub and/or the centre of the roller tool when in use and a partially spherical side that is directed away from the hub and/or the centre of the roller tool. Optionally the orifice is formed in the flat side of the roller.

Optionally the diameter of each roller is greater than the cross-sectional width of the hub, such that at least a portion of the roller extends beyond the roller tool. Preferably, the partially spherical side projects radially, with respect to the longitudinal axis of the roller tool, optionally through the gap between the axially spaced apart at least two sleeves, or optionally through the gap between the outermost walls of the annular recesses of the first and second tubular portions. The larger diameter of the rollers therefore acts to space the roller tool, and thereby the string, from the walls of the wellbore as the string is deployed downhole. Optionally the circumferential edge of the roller, where the spherical side meets the flat side, is machined, for example to form grooves or similar, such that the circumferential edge can obtain a frictional grip with surfaces that it may come into contact with. As the rollers come into contact with the wellbore, they may rotate over debris, obstacles, or uneven surfaces they encounter, easing passage of the tubular into the wellbore.

Optionally the roller comprises a groove on the flat side of the roller. Optionally the groove may be an annular groove extending around the flat side of the roller. The addition of a groove on the flat side of the roller, which faces the centre of the roller tool in use, advantageously offers a passage for debris, e.g. sand and the like, to flow under the roller without interfering with the roller's operation.

Optionally the rollers may be actively driven by motors, for example to drive the rollers over particularly large or difficult obstacles.

Optionally each roller comprises an aperture that extends through the roller and into the orifice, for example to permit lubrication of the roller and/or bearings; or to permit installation of fixing devices.

In a second example of the rollers, each roller may be formed in two connected and integrally formed sections, comprising an upper section and a lower section, where the upper and lower sections may be connected by a stem portion.

Optionally the upper and lower sections have different diameters. Optionally the upper section has a larger diameter than the lower section. Optionally the lower section comprises an orifice that is adapted to receive a bearing assembly in an interference fit as described above. Optionally at least a portion of the outer circumferential edges of the lower section of the rollers extend into the annular recesses of the first and second tubular portions. Optionally the outer walls of the first and second tubular portions thus extend partially over the edges of the lower sections of the rollers when the roller tool is made up. Optionally the rollers are thus free to rotate but restricted from lateral movement by the outer walls of the first and second tubular portions. In the event of disconnection of the rollers from the bearing assembly/hub, the rollers will thus remain held in place on the roller tool by the outer walls of the annular recesses formed in the first and second tubular portions. Optionally the configuration of the base permits the same roller tool to be used with the first and second examples of the rollers.

Optionally the lower section comprises at least a partial circumferentially extending arc that extends towards the central axis of the roller. Optionally the lower section then connects to the upper section by means of the stem portion.

Optionally the upper section is in the form of a spherical cap. Optionally the upper section is spaced apart from the hub, optionally so that the upper section extends beyond the outer surfaces of the first and second tubular sections. Optionally the upper section comprises a lower surface, optionally a flat lower surface, that optionally extends circumferentially from the stem portion. Optionally the lower surface of the upper section extends along the outer surfaces of the first and second tubular portion, optionally with a small clearance such that the rollers may still freely rotate. Optionally the circumferential edge of the upper section of the roller may be machined with, for example, grooves to increase the frictional grip that the roller can get with the walls of the wellbore.

As the upper section is spaced apart from the roller tool, the larger diameter can be used without requiring the roller tool to be similarly increased in size. The larger diameter of the upper section holds the roller tool, and thereby the string, further away from the wellbore wall. This can be particularly useful where, for example, there may be an increased risk of bellying out on larger debris or where the wellbore is known to be particularly uneven. As before, this example of the roller also offers the advantage that no additional fixings are required to fix each roller onto the roller tool, and as the rollers are held in place by the outer walls of the first and second tubular portions extending partially over the lower section of the rollers, the risk of complete detachment of a roller from the roller tool such that it is lost in the wellbore is significantly reduced.

Optionally the roller comprises a central protrusion, which comprises a central orifice. Optionally the central protrusion comprises a first section of optionally a uniform exterior diameter, and optionally a second section comprising a sharply increased exterior diameter, optionally forming a shoulder, followed by a tapered portion back to the original exterior diameter of the first section.

Optionally the hub may also comprise a first aperture for receiving the central protrusion of the roller. Optionally the hub comprises a protrusion on which the bearing assembly may be mounted as previously described. Optionally the protrusion of the hub comprises a central, second, aperture, where the central aperture of the hub protrusion may comprise a uniform diameter, optionally complementary to the first section of the roller protrusion. Optionally the first hub aperture is contiguous with the second hub aperture within the hub protrusion. Optionally the first hub aperture has a larger diameter than the second hub aperture.

Optionally the protrusion of the roller may be inserted into the second hub aperture formed in the hub protrusion. Optionally the protrusion comprises two or more longitudinal portions, for example fingers akin to a collet. Optionally the longitudinal portions are connected at one end to the roller, for example optionally formed in one piece with the roller. Optionally the longitudinal portions are separated or spaced from each adjacent longitudinal section by longitudinally-aligned slits, gaps, or the like, at least partially along the length of the roller protrusion. Optionally the longitudinal portions of the roller protrusion may elastically deform, optionally inwardly towards the longitudinal axis of the roller protrusion (which may be aligned with the central axis of the roller), to optionally permit the second section to decrease in effective diameter and optionally permit passage of the roller protrusion through the second hub aperture. Optionally when the second section of the protrusion of the roller has passed through the second hub aperture it optionally enters the first hub aperture, which optionally has a larger diameter. The second section of the roller protrusion may then return to its original configuration and optionally its original dimensions.

The second section of the roller protrusion may optionally comprise a flattened portion corresponding to the increased diameter, which optionally forms a shoulder on the exterior of the roller protrusion. Optionally the meeting point between the first and second hub apertures also forms a shoulder as the diameters of the first and second hub apertures change from the smaller diameter of the second hub aperture to the larger diameter of the first hub aperture. Optionally the shoulder of the roller protrusion may engage the step between the first and second hub apertures. The engagement between the shoulder of the roller protrusion and the step between the first and second hub apertures resists disconnection of the roller from the hub.

Optionally, in order to further secure the connection between the roller and the hub, a locking member such as a locking pin may be inserted into the central orifice of the central protrusion of the roller. The locking pin may optionally prevent the roller protrusion deforming and passing through the second hub aperture, thereby disconnecting from the hub. This arrangement is advantageously easy to fit and minimises the components forming part of the roller tool while enhancing the connection between the roller and the hub.

The invention is not limited to first and second tubular portions and alternative sleeves may be used, where a portion of the sleeve is adapted to fit over at least a portion of the roller(s) and/or at least a portion of the hub and thereby restrain the roller(s) and/or the hub.

In an alternative arrangement of the hub, the hub may comprise two portions, for example half-shells, which may be fixed together to form the annular hub. Optionally these half-shells are placed over the mandrel of the first tubular portion as described above, such that the hub is at least partially encasing a section of the mandrel. The half-shells are optionally fixed together by fixings, optionally threaded fixings, optionally e.g. grub screws. Optionally the rollers are press-fitted onto the bearing assemblies of the hub as previously described. Optionally, at least one fixing device may be used to further secure each bearing assembly in position.

Alternatively, the hub may be positioned over other suitable tubulars, mandrels, or similar, and the two half-shells fixed together. Optionally the hub may be manufactured with different internal diameters to suit the component that the hub will be positioned over. Optionally the hub may be used together with sleeves that may be fitted over and/or fixed to the hub to restrain the rollers, in place of the annular recesses of the first and second tubular portions described above.

Preferably, the sleeves are formed in a unitary component with their respective first and/or second tubular portion but alternatively, the sleeves could in less preferred embodiments be modified to be separate components from their respective first and/or second tubular portion and in such an embodiment, the sleeves are provided with securing means such as screw threads or are welded to fix them to their respective first and/or second tubular portion.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. Language such as "including", "comprising", "having", "containing" or "involving" and variations thereof, is intended to be broad and encompass the subject matter listed thereafter, equivalents and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee. In particular, positional references in relation to the well such as "up" and similar terms will be interpreted to refer to a direction toward the point of entry of the borehole into the ground or the seabed, and "down" and similar terms will be interpreted to refer to a direction away from the point of entry, whether the well being referred to is a conventional vertical well or a deviated well.

BRIEF DESCRIPTION OF THE DRAWINGS

Embodiments or the invention will now be described by way of example only, with reference to the accompanying drawings in which:—

FIG. 1 shows a first cross-sectional view of a roller tool apparatus according to the present invention, with a first example of the rollers being mounted on a first example of a (one piece) hub.

FIG. 2 shows a second cross-sectional view of the apparatus of FIG. 1 rotated by 90° around its longitudinal axis;

FIG. 3 shows an end view of the apparatus of FIG. 1;

FIG. 4 shows a perspective view of the apparatus of FIG. 1;

FIG. 20 shows a side view of a second example of a roller tool according to the present invention, with the bearing assemblies and rollers being held by circlips, and a set screw reinforcing the threaded connection between the first and second tubular portions;

FIG. 21 shows a longitudinal cross-sectional view of the apparatus of FIG. 20;

FIG. 22 shows a transverse cross-sectional view of the apparatus of FIG. 20;

FIG. 23 shows a close-up view of the circled section marked C in FIG. 22;

FIG. 24 shows a side view of a third example of a roller tool according to the present invention, including annular bearing races between the hub and the mandrel, and an atmospheric chamber formed between the male and female threaded sections of the first and second tubular portions;

FIG. 25 shows a longitudinal cross-sectional view of the apparatus of FIG. 24;

DETAILED DESCRIPTION OF EXAMPLES OF THE INVENTION

Figure 5:
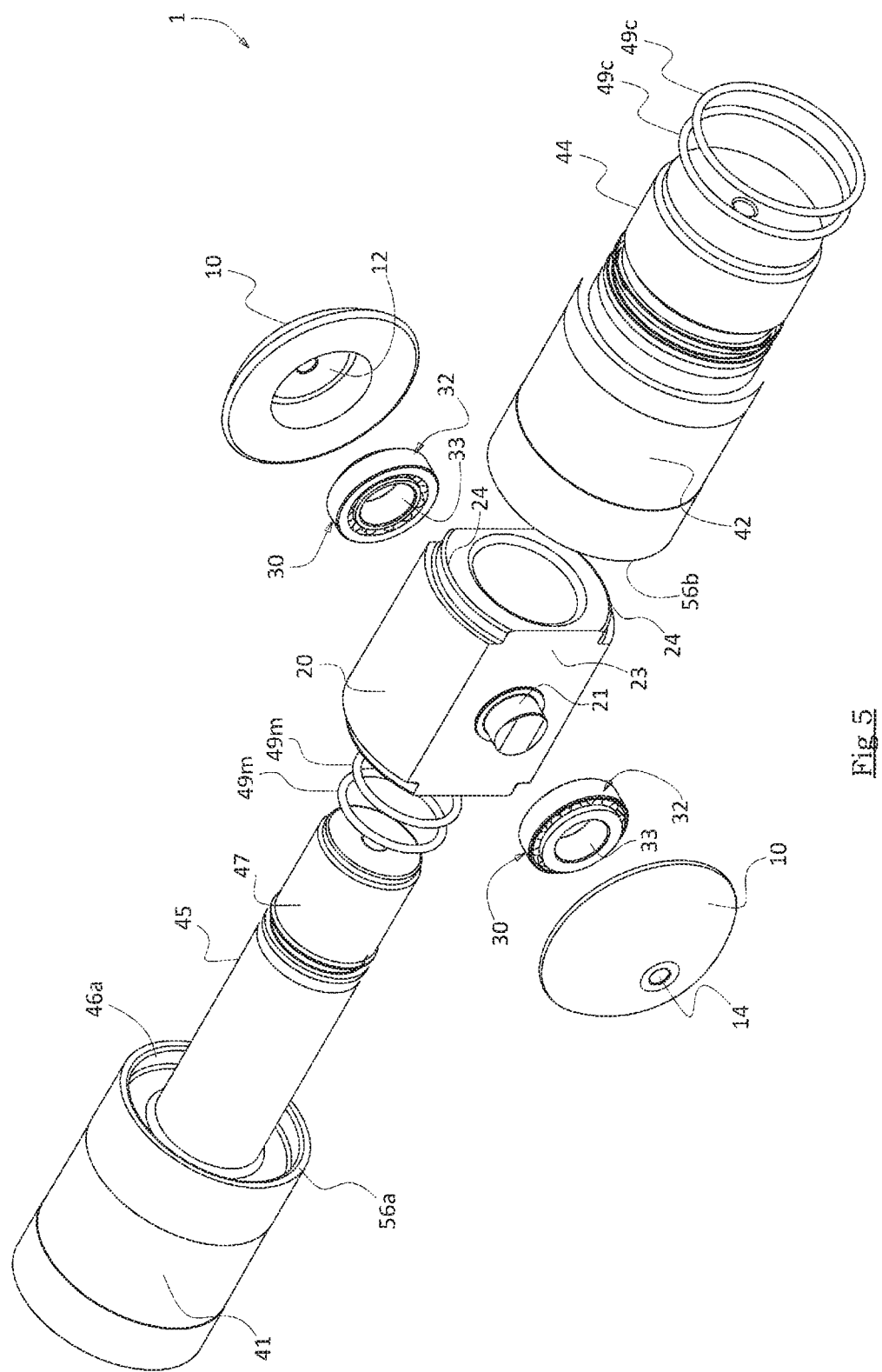
FIG. 5 shows an exploded view of the apparatus of FIG. 1.

Referring now to the drawings, a roller tool 1 comprises two interconnecting tubular portions configured to form part of a string (not shown) deployed into or recovered from an oil or gas well (not shown), the interconnecting tubular portions comprising a first (male) connector 41 and a second (female) connector 42. An annular hub 20 is arranged to slide over a section of the first connector 41 and provide a connection point or hub 20 for the roller devices of the roller tools, here in the form of rollers or wheels 10, which are affixed to the hub 20 in use. The roller tool 1 is provided with suitable connections to allow it to be incorporated or included in the string, where the string may be a suitable tubular string such as a work string and in particular a wireline run string, a coiled tubing string or a drill pipe string. Alternatively, the roller tool 1 may be modified to allow it to be used on other types of downhole string such as casing or liner strings to be installed in the wellbore.

The first connector 41 comprises a box connection 43 at one end, with a screw threaded female connection 43S having a standard diameter suitable for interconnection with a pin connection (not shown) typically formed at the lower end of a first section of the string (not shown) or similar. However, it should be noted that connections other than screw threads 43S may be provided in order to suit whatever interconnection is formed at the lower end of the first section of the string such as "quick connect" type connections (not shown) which are becoming more common on wireline run strings in recent times. At the other end of the first connector 41, there is an extended cylindrical section or mandrel 45 which has a smaller diameter than the box connector 43. The mandrel 45 comprises a male end 47, axially spaced from the box connector 43, that is adapted to securely engage (e.g. via a suitable connection means such as screw threads) with a female end 48 on the second connector 42. The male end 47 comprises seals, in this example two annular e.g. O-ring seals 49m, located in annular recesses on the outer surface of the male end 47. The seals 49m resist ingress of fluid and/or debris into the central throughbore 40b from the annulus outside of the roller tool 1 when the connection between the first 41 and second 42 connectors is made up.

The second connector 42 comprises a pin connector 44 at one end and the female end 48 at the other end, axially spaced from the pin connector 44. The female end 48 receives the male end 47 of the first connector 41 when the roller tool 1 is made up. The pin connector 44 comprises annular seals 49c disposed in annular recesses around the outer surface of the pin connector 44. The pin connector 44 further comprises a suitable screw thread male connection 44S having a standard diameter suitable for interconnection with a box connection (not shown) typically formed at the upper end of a second section of the string (not shown). However, it should be noted that connections other than screw threads 44S may be provided in order to suit whatever interconnection is formed at the upper end of the second section of the string such as "quick connect" type connections (not shown) which are becoming more common on wireline run strings in recent times. In this example the connectors 41, 42 have a central throughbore 40b for an electrical feedthrough to pass therethrough, and/or for fluid, and/or for other objects or items to pass therethrough such as detonating cord (not shown) used to detonate perforating guns (not shown) located below the roller tool 1 in the string.

When the male end 47 of the first connector 41 is engaged with the female end 48 of the second connector 42, there remains an axially extending portion of the mandrel 45 disposed between the box 43 and pin 44 connectors. The annular hub 20 has a central bore that allows the hub 20 to slide over and surround the mandrel 45 prior to engagement of the first 41 and second 42 connectors.

The first 41 and second 42 connectors both comprise annular recesses (or spaces) 46a, 46b which are formed in the inner portion of the outer walls of the first 41 and second 42 connectors such that inwardly and oppositely directed sleeves (or lips) 56a, 56b are retained or formed as the outer most portion of the ends of the outer walls of the first 41 and second 42 connections and which over hang or shroud the recesses 46a, 46b and as will be described, the sleeves 56a, 56b will act to retain the wheels 10 within the recesses 46a, 46b in case of unwanted detachment of the wheels 10 from their respective bearing assembly 30. It will also be appreciated that the shortest distance X between the inner most ends of the two sleeves 56a, 56b is shorter or lesser than the greatest diameter Y of the roller 10 held captive within the respective recess 46a, 46b and thus, in use, the inner most ends of the sleeves 56a, 56b eclipse the outer surface of the outer portion of the greatest diameter of the rollers 10 and thus will prevent or restrain the rollers 10 from passing or falling through the gap X between the inner most ends of the two sleeves 56a, 56b if the rollers 10 were to unexpectedly or accidentally part company with their respective bearing assembly 30.

The hub 20 comprises a longitudinally extending section 22 that is flush with the outer surfaces of the first 41 and second 42 connectors at their largest diameters, and shoulders 24 (see FIG. 2) provided at its upper and lower ends which extend only partially radially around the hub 20 and are configured to fit within the annular recesses 46a, 46b. The shoulders 24 act to hold the hub 20 in a coaxial arrangement with the first 41 and second 42 connectors, while permitting rotational movement of the hub 20 around the central longitudinal axis of the roller tool 1. Accordingly, the hub 20 is arranged co-axially around the first connector mandrel 41 and is free to rotate about the central longitudinal axis of the roller tool 1. The shoulders 24 thus comprise an outer diameter that is close to the inner diameter of the annular recesses 46a, 46b so that movement of the hub 20 perpendicular to the axis of the roller tool 1 is restricted while the hub 20 may still freely rotate around the mandrel 45.

The hub 20 further comprises two flat sections 23 (see FIG. 5), on which the wheels 10 are mounted. The flat sections 23 are formed as symmetrically arranged longitudinal slices along opposing sides of the hub 20, and therefore the shortest distance between the central axis to an outer surface of the flat section 23 is less than the shortest distance between the central axis to an outer surface of e.g. a shoulder 24.

Figures 6, 7:
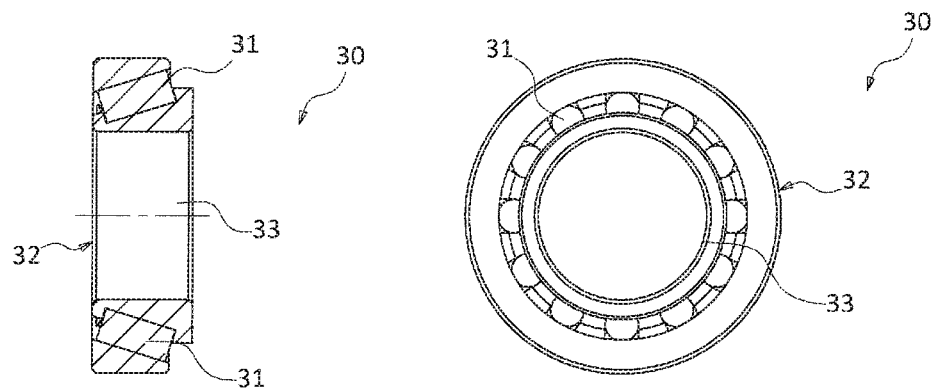
FIG. 6 shows a close-up cross-sectional view of a bearing assembly used within the roller tool apparatus of FIG. 1.
FIG. 7 shows an end view of the bearing assembly of FIG. 5.
Figure 8:
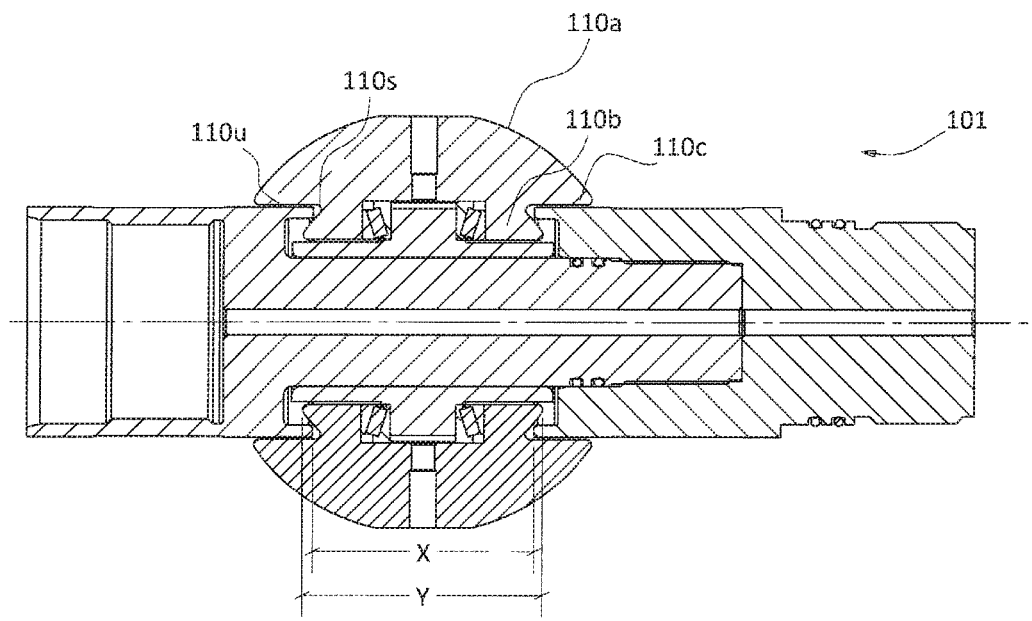
FIG. 8 shows a first cross-sectional view of the roller tool apparatus according to the invention, with a second example of the rollers being mounted on the same first example of hub shown in FIG. 1.
Figure 9:
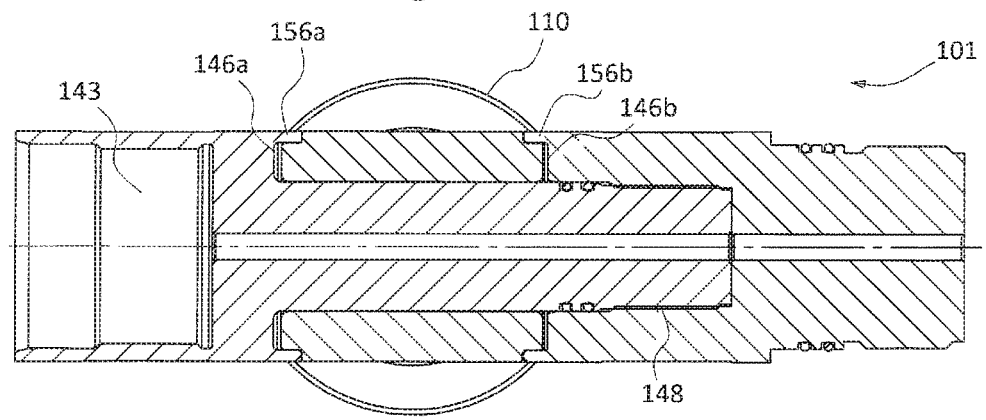
FIG. 9 shows a second cross-sectional view of the apparatus of FIG. 8 rotated by 90° around its longitudinal central axis.
Figure 11:
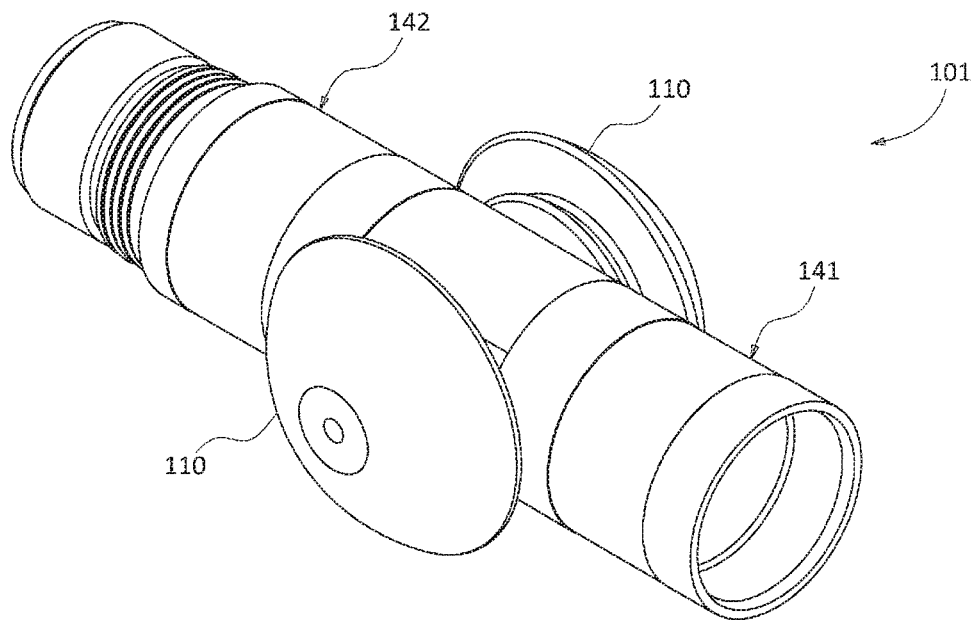
FIG. 11 shows a perspective view of the apparatus of FIG. 8.
Figure 10:
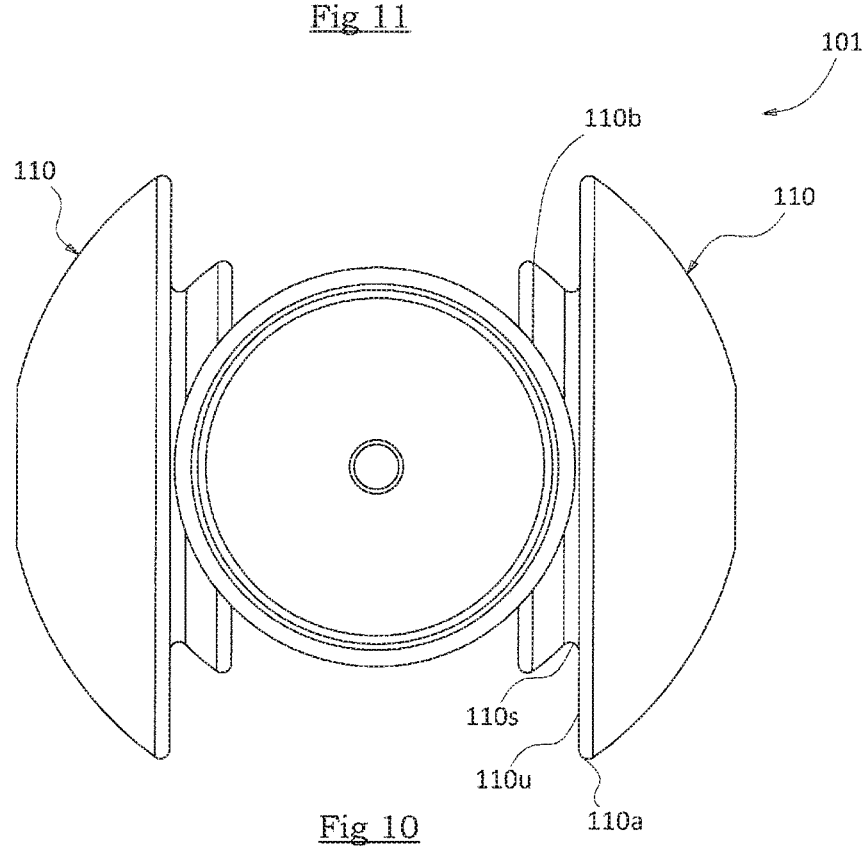
FIG. 10 shows an end view of the apparatus of FIG. 8.
Figure 12:
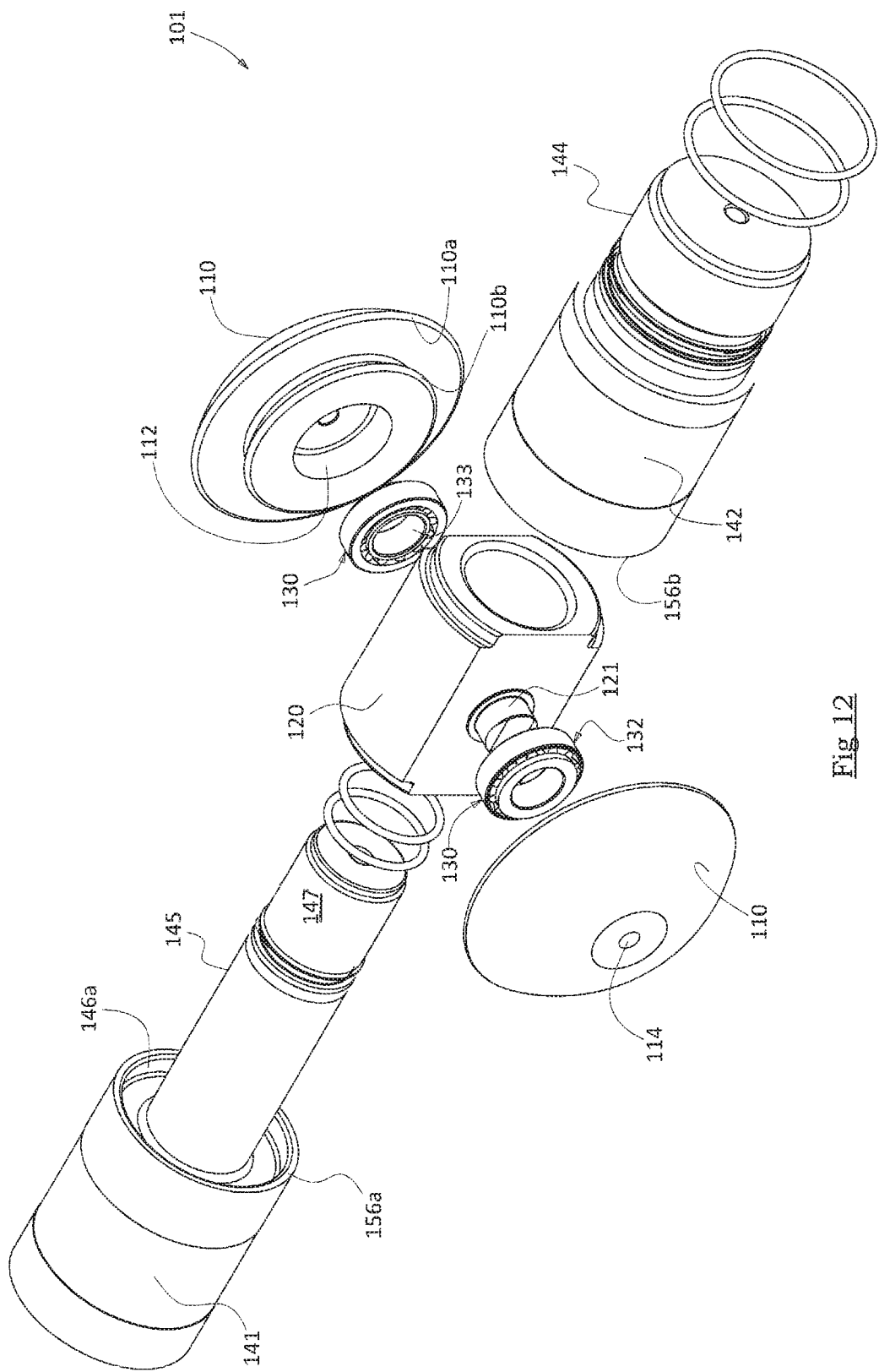
FIG. 12 shows an exploded view of the apparatus of FIG. 8.
Figure 13:
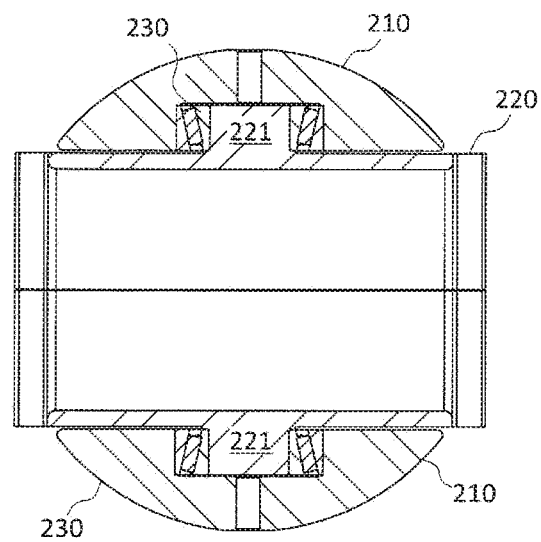
FIG. 13 shows a cross-sectional view of a second example of a two-piece hub that can be used instead of the one-piece hub shown in FIG. 1.

Each flat section 23 comprises a seat 21 for a bearing assembly 30 (see e.g. FIGS. 1 and 5). The seat 21 protrudes perpendicularly to the central axis of the roller tool 1 and is of a form to compliment the form of a fitting surface of the bearing assembly 30 and in the present example is in a cylindrical form. The bearing assembly 30 is annular with a central aperture 33 around which the bearings 31 are arranged in a housing 32, best seen in FIGS. 6 and 7. The inner bore of the bearing assembly 30 fits over and around the outer cylindrical surface of the seat 21 in a tightly fitting arrangement (which is preferably an interference fit), where the centre of the bearing assembly is held in place and the outer section of the bearing housing 32 is free to rotate around the bearings 31. When the bearing assembly 30 is slotted over the seat 21, the outermost end of the seat 21 is flush with the outermost end of the bearing assembly 30. The bearings 31 are tapered roller bearings (which comprise a plurality of frusto-conically shaped longitudinally extending rollers but which alternatively could comprise a plurality of barrel or cylindrically shaped rollers) and the bearing assembly 30 may be, for example, a FAG tapered roller bearing assembly offered by SCHAEFFLER (UK) Ltd.

Each wheel 10 comprises a central orifice 12 which allows the wheel 10 to be fitted over the bearing assembly 30 in a press-fit or interference fit arrangement. The diameter of each wheel 10 is selected so that the outer edge portions of each wheel 10 extends into the annular recesses 46a, 46b, into the gap between the flat section 23 and the recess 46a, 46b. The wheels 10 are configured so that they do not make contact with the first 41 and second 42 connectors in use and are therefore able to rotate freely as the roller tool 1 travels downhole. However, as a portion of each wheel 10 is contained within the annular recesses 46a, 46b, should a wheel 10 become disconnected at any point from the hub 20 or the bearing assembly 30, it will remain in position within the roller tool 1, as the sleeves 56a, 56b eclipse the annular recesses 46a, 46b and thus the outer most diameter of the wheels 10 and thus restrict the wheel 10 from detachment from the tool 1. This configuration has the great advantage that the wheels 10 can be fitted onto and into the tool 1 without requiring any addition fixings, e.g. screws or bolts, and therefore reduces the risk of component parts falling into the wellbore. Additionally, as the wheels 10 themselves are restrained and held in position within the annular recesses 46a, 46b of the first 41 and second 42 connectors by the respective sleeves 56a, 56b, the wheels 10 are unable to fall off the tool 1 through the gap X and thus are restrained by the sleeves 56a, 56b within the recesses 46a, 46b and will remain in a captive position in the recesses 46a, 46b until the tool 1 is retracted from the wellbore. This further reduces the risk of catastrophic failure occurring downhole as a result of a part of the tool 1 accidentally falling into the wellbore.

The diameter of each wheel 10 is greater than the largest cross-sectional width of the hub 20 (i.e. sections 22 that are flush with the outer surfaces of the first 41 and second 42 connectors), such that at least a portion of the wheel 10 extends beyond the roller tool 1. The larger diameter of the wheels 10 acts to space the roller tool 1 and thereby the string, from the walls of the wellbore as the string is deployed downhole. Additionally, as shown in FIG. 1, the greatest radially outer most portion of the wheel 10 projects through the gap X between the sleeves 56a, 56b thus ensuring contact is made by the wheel 10 with the wellbore (rather than the outer surface of the first 41 and/or second 42 connectors (and thus the rest of the string)).

The wheel 10 further comprises an aperture 14 which extends through the wheel 10 and can be used to supply lubricant to the orifice 12 of the wheel 10 and the bearing assembly 30.

In the first example of the invention shown in FIGS. 1-5, the wheels 10 are of a single spherical cap form.

In an alternative example shown in FIGS. 8-12, the wheel 110 may have a different shape so that it extends further from the tool 101. Other than the wheel 110, the tool 101 comprises the same parts as described above, which for brevity will not be described again in detail other than in relation to the wheel 110. Where common parts are described in relation to the tool 101, their numbers will be increased by 100 over those numbers used in relation to tool 1.

Briefly, the roller tool 101 comprises a first connector 141 having a box connector 143 at one end and a male end 147 at the other axially spaced end of the first connector 141, and an axially-extending mandrel 145; and a second connector 142 having a female end 148 that receives the male end 147 at one end of the second connector 142, and a pin connector 144 at the other axially spaced end. The first 141 and second 142 connectors each comprise annular recesses 146a, 146b and sleeves 156a, 156b. A hub 120 fits over the mandrel 145 as before. Bearing assembly 130 comprises an aperture 133 that is adapted to slide over the seat 121 on the hub 120.

The wheel 110 comprises an upper 110a and lower 110b section having different diameters, but integrally formed as a single wheel 110. The lower section 110b is connected to the roller tool 101 by press-fitting onto a bearing assembly 130 as previously described. The diameter of the lower section 110b is selected so that the outer circumferential portions 110c of the wheel 110 fit between the flat portions of the hub 120 and the annular recesses 146a, 146b of the first 141 and second 142 connectors, such that the wheels 110 are able to freely rotate, but are restricted from movement away from the roller tool 101, i.e. the wheels 110 are held to the roller tool 101 by the sleeves 156a, 156b extending over the annular recesses 146a, 146b in the event of detachment of a wheel 110.

In a preferential arrangement, the diameters of the wheels 10, 110 that engage with the hub 20, 120 are the same, permitting the same connectors 41, 42, 141, 142 and hub 20, 120 to be used with different styles of wheel 10, 110, so that the wheels 10, 110 are interchangeable.

The lower section 110b comprises a partial arc towards a central axis of the wheel 110. The lower section 110b then connects, via stem 110s, to a further spherical cap-shaped upper section 110a which has a larger diameter than the lower section 110b. The underside 110u of the upper section 110a is flat and the height or radial depth of the lower section 110b is chosen so that the underside 110u of the wheel 110 is very close to the outer surfaces of the connectors 141, 142, but does not make contact with the connectors 141, 142, in order to allow free rotation of the wheels 110. The outer circumferential portions of the upper section 110b extend axially along the other surface of each of the first 141 and second 142 connectors, and thereby the wheels 110 protrude beyond the outer diameter of the string. The larger wheels 110 can hold the rest of the roller tool 101, and therefore the string section, further away from the walls of the wellbore. This offers additional clearance of the string, reducing the chance of the string bellying out and enhancing the ability of the roller tool 101 to travel past larger obstacles, rougher sections of the wellbore, or debris, for example. As above, the advantage of reduction in component parts by not requiring additional fixtures for the wheels 110, and by having a means (in the form of sleeves 156a, 156b) of holding or retaining the wheels 110 in place on the roller tool 101 even in the event of detachment of a wheel 110, is that there is a much reduced risk of parts of the roller tool 101 falling into the wellbore.

The wheels 10, 110 shown in the Figures are freewheeling (non-motorised) but the roller tool 1, 101 may be modified by the addition of motors (not shown) such that the wheels 10, 110 may be driven by motors. For additional frictional grip during rotation, whether the wheels 10, 110 are driven by motors or whether they passively rotate, the circumferential edges of the wheels 10, 110 can be machined with grooves, for example, to provide a roughened surface and increased grip under rotation.

In an alternative example of the hub, shown in FIGS. 13-19, the hub 220 is formed of two halves or half-shells. As in the previous examples and for brevity not described here again in detail, the hub 220 comprises a seat 221 for a bearing assembly 230 onto which a wheel 210 may be engaged in a press-fit connection.

Figure 14:
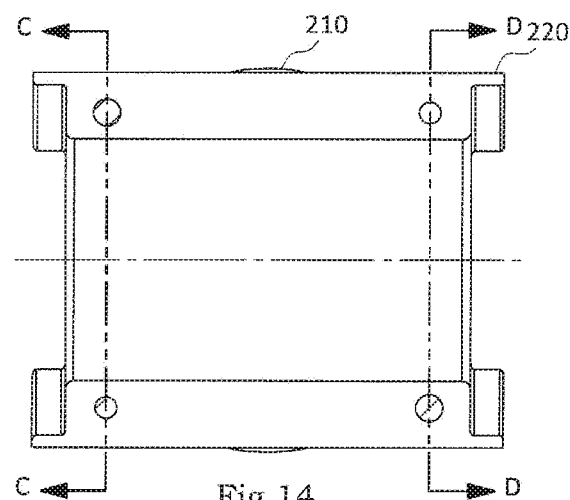
FIG. 14 shows a second cross-sectional view of the two-piece hub of FIG. 13 rotated by 90° around its longitudinal central axis.
Figure 15:
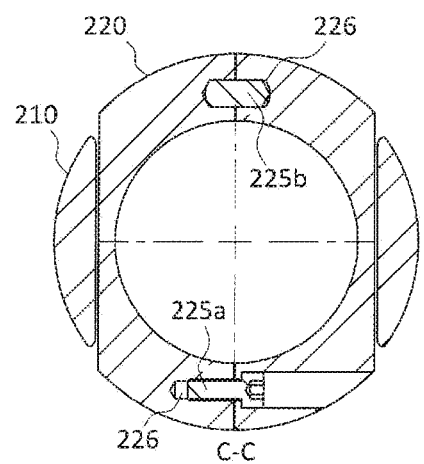
FIG. 15 shows a view of one end of the two-piece hub of FIG. 13.
Figure 16:
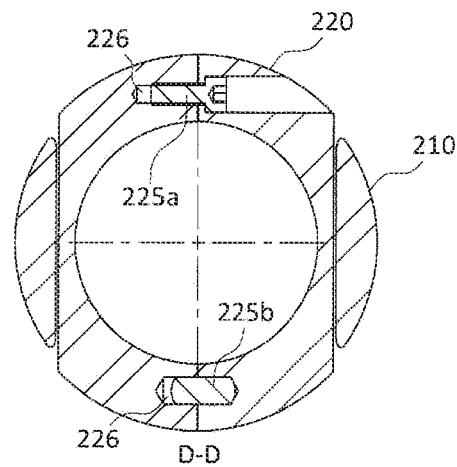
FIG. 16 shows a view of the other end of the hub of FIG. 13.
Figure 17:
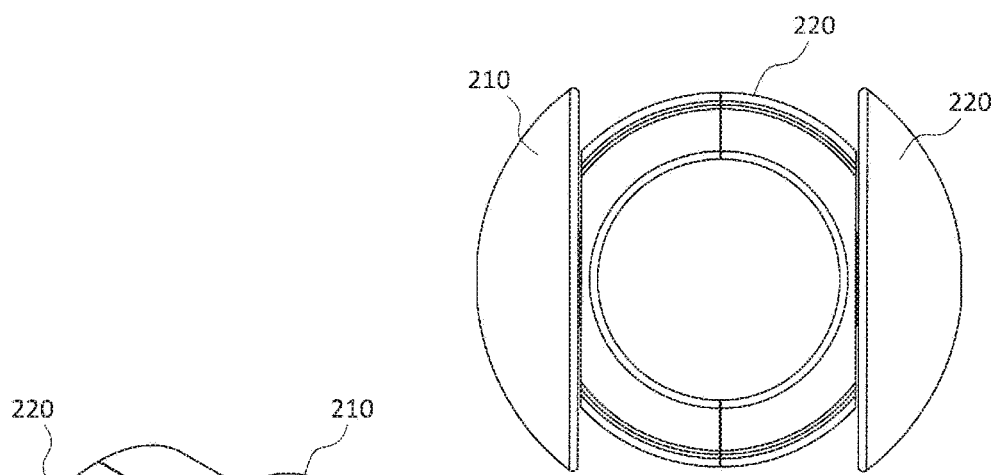
FIG. 17 shows a further end view of the two-piece hub of FIG. 13 with rollers attached where the rollers are similar or identical to the first example of rollers shown in FIG. 1.
Figure 18:
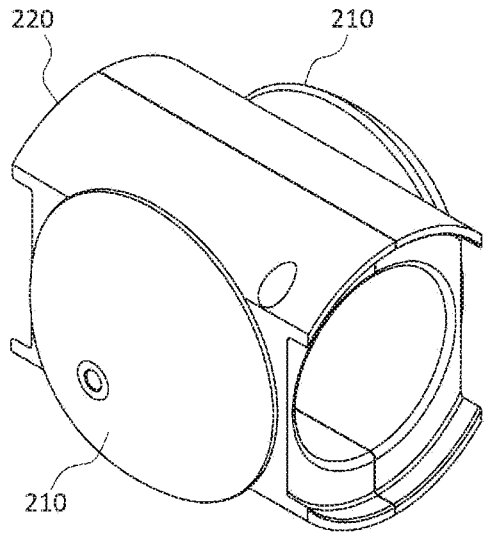
FIG. 18 shows a perspective view of the two-piece hub and rollers of FIG. 13.
Figure 19:
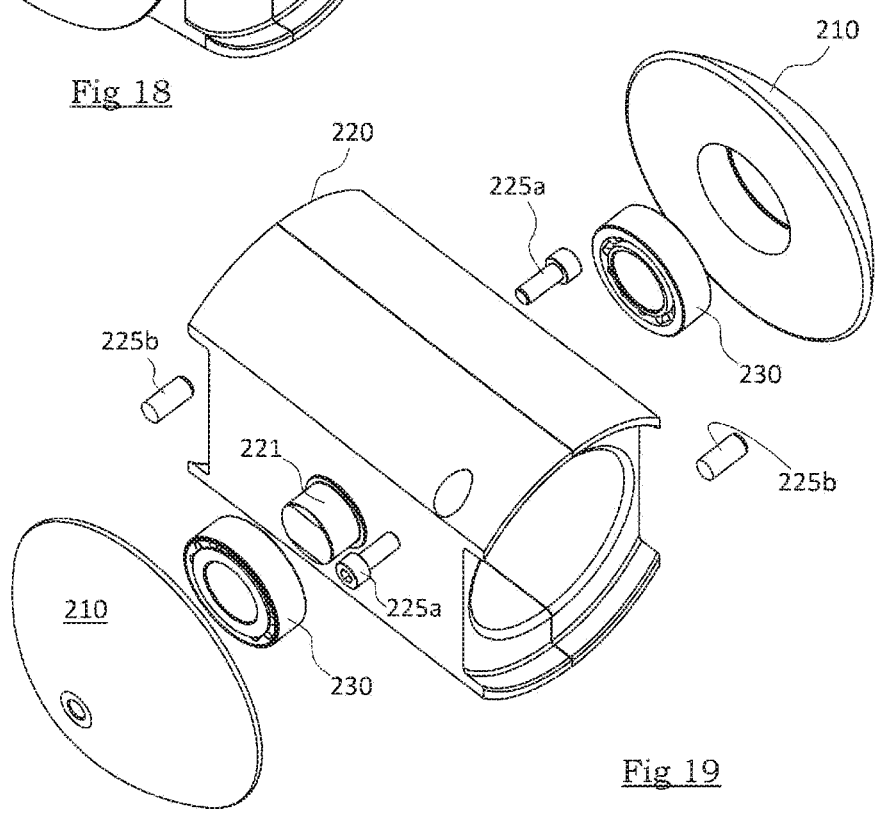
FIG. 19 shows an exploded view of the two-piece hub and rollers of FIG. 13.

The two halves of the hub 220 may be placed around a mandrel of the first and second connectors as previously described (not shown in FIGS. 13-19). Alternatively, the hub 220 may be positioned on other tools, mandrels, sleeves or tubulars as required. The dimensions of the hub 220 and the wheels 210 may be adjusted accordingly. The skilled reader will note that the wheels 210 look smaller in FIGS. 14 to 16 than in FIG. 13 but that is just because FIGS. 14 to 16 are sectional views and the wheels 210 are shown in their correct size at the section point.

The two halves of the hub 220 are placed together and fixed by fixings 225a, 225b such as bolts or screws e.g. grub screws. The fixings 225a, 225b are threaded into apertures 226 formed in the hub 220.

In an alternative example of the roller tool illustrated in FIGS. 20-23, a similar numbering scheme is adopted as that of earlier examples, prefixed by 3, for ease of reference and comparison. Features in common with previous examples are not described in detail again but the reader is referred to the examples detailed above.

Roller tool 301 has a female connector 342 comprising a radial orifice 360. The orifice 360 extends through the wall of the female connector 342, from the inner threaded surface 348 of the female connector 342 to the outer surface of the female connector 342, and is perpendicular to the longitudinal axis of the roller tool 301. The orifice 360 is threaded and receives a set screw 361. After the male end 347 of the mandrel 345 is received within the threaded portion 348 of the female connector 342 and the connection is made up, the set screw 361 is inserted into the orifice 360. The set screw 361 is then rotated until it engages the threaded portion of the male end 347 of the mandrel 345. The engagement between the set screw 361 within the wall of the female connector 342 and the threaded portion of the male end 347 of the mandrel 345 reinforces the threaded connection between the female connector 342 and the male end 347 has the great advantage of resisting and preventing the threaded connection backing off, which if it did occur, would result in the unwanted loosening and/or separation of the two connectors 341, 342.

The roller tool 301 also comprises hubs 320, wheels 310, and sealed bearing assemblies 330. In this example of the roller tool 301, the wheels 310 comprise a central orifice 312 into which the bearing assembly 330 is inserted. The surface of the orifice 312 has a groove or a cut-away portion 330g which is dimensioned to receive the bearing assembly 330.

Once the bearing assembly 330 is positioned within the orifice 312 of the wheel 310, a (first) circlip 371 is inserted into the orifice 312 at the side of the bearing assembly 330 that will be facing towards the mandrel 345. The surface of the orifice 312 comprises a groove 371g into which the circlip 371 snap fits. The positioning of the circlip 371 in the groove 371g thus retains the bearing assembly 330 within the orifice 312 of the wheel 310 and advantageously acts to resist separation of the wheel 310 from the bearing assembly 330.

Once the circlip 371 is inserted into the groove 371g, the combined assembly of the wheel 310 and the bearing assembly 330 (with the circlip 371) is then slid over the seat 321 of the hub 320. In this example, the wheel 310 is not in a press-fit engagement with the bearing assembly 330. For this reason, a further circlip 372 is then inserted above the bearing assembly 330, i.e., at the side of the bearing assembly 330 that is facing away from the mandrel 345. The circlip 372 snap-fits into a groove 372g that is formed in the seat 321 on the hub 320. The aperture 314 of the wheel 310 is increased in diameter in comparison to previous examples in order to facilitate the insertion of the circlip 372 after the wheel 310 and bearing assembly 330 etc. are in position over the seat 321. The circlip 372 acts to resist separation of the wheel 310 from the seat 321, and therefore the hub 320, and thus enhances the resilience of the roller tool 301.

The further example of the wheel 310 illustrated in FIGS. 20-23 comprises an annular groove 315 in the flat surface of the wheel 310 that is facing the hub 320. The groove 315 allows debris to flow through the groove 315 and reduces the risk of debris ingress potentially leading to a reduction in performance of the roller tool 301.

A yet further example of a roller tool 401 is illustrated in FIGS. 24-29. Parts in common with earlier examples are not described again in detail unless directly relevant to the description of differences between this example and previous ones, and the reader is directed to the preceding sections of the description. Like parts retain the same numbering preceded by 4.

The roller tool 401 comprises wheels 410 and hub 420. In this example, there are two annular bearing races 480 positioned between the inner surface of the hub 420 and the outer surface of the mandrel 445. In order to retain the tight clearance of the wheels 410 and other components of the roller tool 401 as described above, suitably-dimensioned grooves 481 are formed in the outer surface of the mandrel 445, and complementary grooves 482 are formed on the inner surface of the hub 420. The grooves 481, 482 are aligned with each other to form each bearing race 480 and the bearings 480b (here ball bearings 480b) are contained between them such that almost the entirety of each bearing 480b is enclosed within the annular grooves 481, 482.

Prior to the bearings 480b being placed within the bearing races 480, the hub 420 is positioned on the mandrel 445. The hub 420 includes two apertures 484 aligned with the grooves 481,482 for the bearings 480b. Once the hub 420 is in position, the bearings 480b are passed through the apertures 484 into the bearing race 480 until the race 480 is filled or has sufficient bearings 480b in it to facilitate the enhanced rotation of the hub 420. In order to prevent the bearings 480b returning through the apertures 484, a race pin 483 is inserted above the bearing race 480 to block the apertures 484. The race pin 483 can be inserted into the hub 420 from one end of the hub 420, and is then held in place when the first 441 and second 442 connectors are connected. The race pin 483 is securely held in the desired position by having an end portion with a larger cross-section than the rest of the race pin 483 so that it forms a shoulder 483s. The shoulder 483s of the race pin 483 engages a shoulder 420s of the hub, and when the connection is made up, the race pin 483 is thus held in place.

The ball bearings 480 further reduce the friction between the hub 420 and the mandrel 445 and thus enhance the rotation of the hub 420 around the longitudinal axis of the mandrel 445, which can be beneficial in certain downhole operations, for example where a string or part of a string may be reoriented and require rotation as it is being run into the well. As the hub 420 rotates around an axis that is perpendicular to the axis of rotation of the wheels 410, the roller tool 401 can maintain contact between the wheels 410 and the wall of the well etc. whatever the orientation of the string, and therefore whatever the orientation of the roller tool 401.

Figure 26:
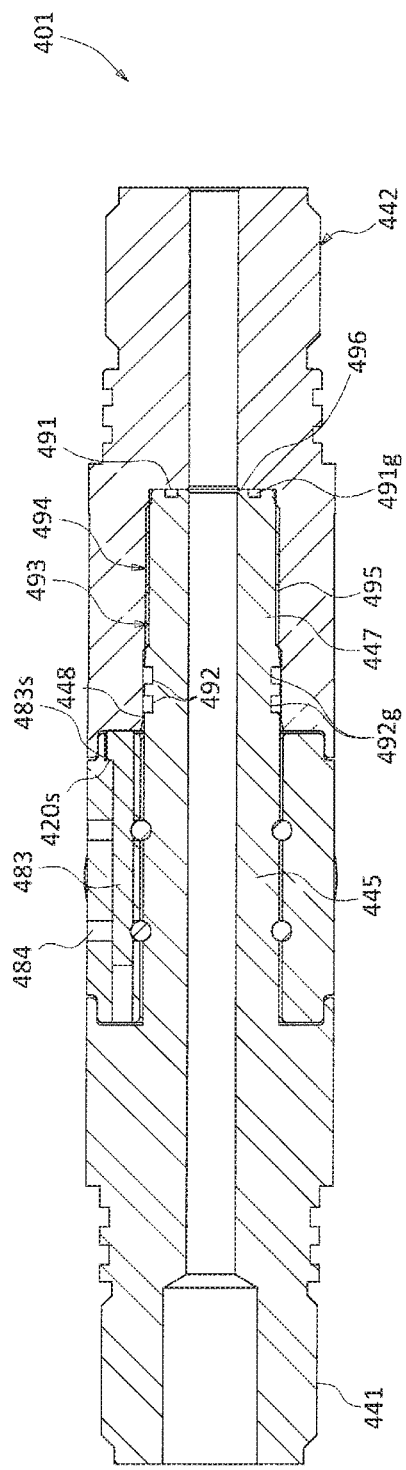
FIG. 26 shows a further longitudinal cross-sectional view of the apparatus of FIG. 24 rotated by 90° around its longitudinal axis.
Figure 27:
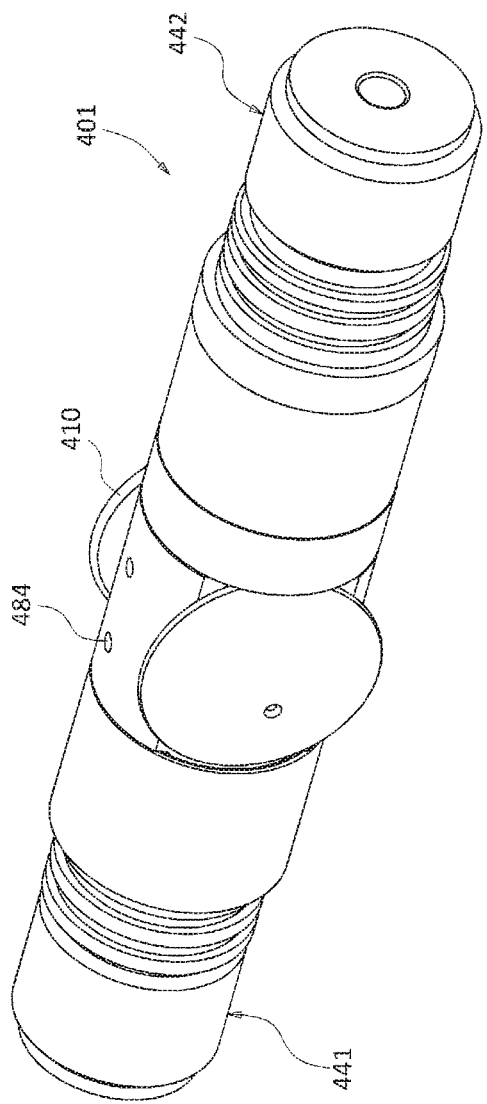
FIG. 27 shows a perspective view of the apparatus of FIG. 24.

Also illustrated in FIGS. 24-29 and best seen in FIG. 26 is a further example of the male end 447 of the mandrel 445. The male end 447 comprises annular seals 492 disposed within annular grooves 492g formed on the outer surface of the male end 447. The annular seals 492 are located at the end of the male end 447 that is nearest the opening to the female end 448 of the connector 444. The end face 496 of the male end 447 also comprises a face seal 491 that is positioned in a groove 491g that is formed on the end face 496. Accordingly, at least one annular seal 492 is provided at one end of the male end 447 threaded portion and a face seal 491 is provided at the other end of the male end 447 threaded portion.

The effect of the seals 492, 491 is to create a chamber 495 between the outer surface 493 (at an in use uppermost end) of the threaded portion of the male end 447, and the inner surface 494 (at an in use lowermost end) of the threaded portion of the female end 448, where the entire screw threaded connection 493, 494 is contained within said chamber 495. When the connection between the first 441 and second 442 connectors is made up, the chamber 495 is at atmospheric pressure. The seals 492, 491 maintain the atmospheric pressure within the chamber 495.

When the roller tool 401 is deployed in a downhole environment, it is exposed to external pressures that are significantly higher than atmospheric pressure—for example 15,000 psi (equivalent to approximately 103 MPa). The effect of the high external pressure, and the significant pressure difference between the exterior of the roller tool 401 and the atmospheric chamber 495, leads the female end 448 of the second connector 442 to press inward, biting in to the threaded connection 493, 494 and acting to resist backing off of the connection 493, 494. The atmospheric chamber 495 thus helps to resist separation of the two connectors 441, 442.

When the roller tool 401 is returned to the surface, the pressure difference is no longer a factor, and the two connectors 441, 442 can be separated as normal.

Figure 28:
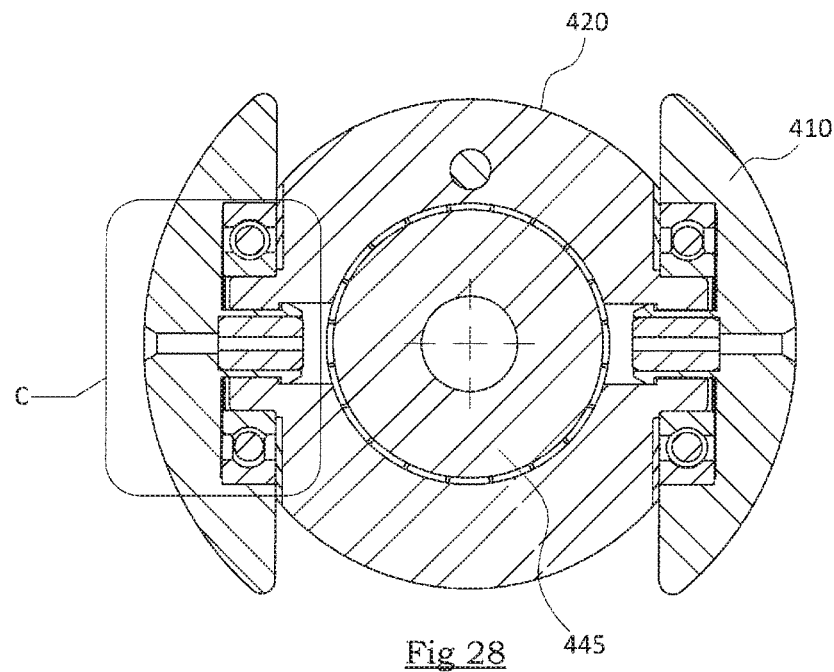
FIG. 28 shows a transverse cross-sectional view of the apparatus of FIG. 24.
Figure 29:
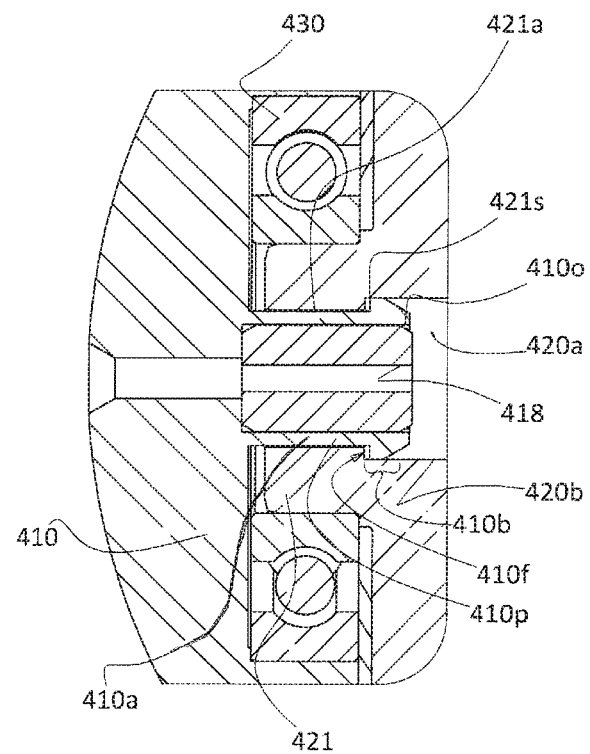
FIG. 29 shows a close-up view of the circled section marked C in FIG. 28.

The roller tool 401 comprises an alternative connection between the wheel 410 and the hub 420, which is best seen in FIGS. 28 and 29. In this example, the wheel 410 comprises a central protrusion 410p which comprises a central orifice 410o. The protrusion comprises a first section of a uniform exterior diameter 410a, and a second section 410b that initially comprises a sharply increased exterior diameter 410f followed by a tapered portion back to the original exterior diameter of the first section 410a.

The central protrusion 410p comprises a plurality of elastically deformable longitudinally extending fingers (not visible in the illustrations). The fingers are each connected to the roller 410 at the top end of the central protrusion 410p as best seen in FIG. 29.

In this example, the hub 420 comprises an aperture 420a that receives the central protrusion 410p of the wheel 410. The hub 420 comprises the seat 421 on which the bearing assembly 430 is seated as before, where the seat 421 has a central aperture 421a comprising a uniform internal diameter that is complementary to the first section 410a of the protrusion 410p of the wheel 410.

The aperture 420a formed in the hub 420 is contiguous with the aperture 421a of the seat 421, and comprises a section 420b having a larger internal diameter than that of the aperture 421a of the seat 421.

To mount the wheel 410 onto the hub 420 and bearing assembly 430, in this example the wheel's protrusion 410a is pushed into the aperture 421a of the seat 421. As, at this stage, the central orifice 410o of the wheel 410 is empty.

The fingers of the central protrusion 410p flex inwardly, towards the central axis of the roller 410/the longitudinal axis of the central protrusion 410p, in order to permit the central protrusion 410p to be inserted into the aperture 421a. In particular, the larger exterior diameter portion 410f can thus be pushed inwardly as the central protrusion 410p passes through the aperture 421a.

When the section 410b of the protrusion 410p reaches the aperture 420a of the hub 420, as this aperture 420a has a section 420b of larger internal diameter than the seat aperture 421a, the fingers (and thus the section 410b of the protrusion 410p) spring back outwards to their original configuration. The larger diameter section 410b of the protrusion 410p comprises a flat shoulder portion 410f formed by the sudden increase in external diameter. This flat shoulder 410f engages a shoulder 421s formed by the corresponding increase in internal diameter between the seat aperture 421a and the hub aperture 420a. The engagement of the two shoulders 410f, 421s prevents the wheel 410 disconnecting from the hub 420.

In order to further secure the engagement between the two shoulders 410f, 421s, a locking pin 418 is inserted into the central orifice 410o of the protrusion 410p of the wheel 410 from the inner bore of the hub 420 (prior to the hub 420 being mounted on the mandrel 445). This prevents the walls of the protrusion 410p from distorting and collapsing inwards towards the central axis of the wheel 410 and thereby being able to pass through the aperture 421a of the seat 421.

A plurality of roller tools 1, 101, 301, 401 may be incorporated into a string and in this case, will typically be spaced apart along its lengths at regular or non-regular intervals.

Modifications and improvements may be made to the examples hereinbefore described without departing from the scope of the invention. In particular, the sleeves 56a, 56b could in less preferred embodiments be modified to be separate components from the first 41 and second 42 connectors and in such an embodiment, the sleeves would be provided with securing means such as screw threads or could be welded to fix them to the first and second connectors or to components equivalent or broadly similar to the first and second connectors 41, 42.

The invention claimed is:

1. An apparatus comprising:
   a downhole tool comprising:
      a connector portion configured for connection to a tool string, wherein the connector portion has an outer diameter;
      a mandrel connected to the connector portion, wherein the mandrel has an outer diameter that is smaller than the outer diameter of the connector portion;
      a lip extending circumferentially around the mandrel, wherein the mandrel and the lip collectively define an annular space;
      an annular hub disposed around the mandrel, wherein the annular hub is rotatable around the mandrel; and
      a plurality of wheels connected to the annular hub, wherein each wheel is rotatable, wherein the annular hub and the wheels are collectively rotatable around the mandrel, and wherein a portion of an outer edge of each wheel is disposed within the annular space.

2. The apparatus of claim 1 wherein a bore extends longitudinally through the connector portion and the mandrel.

3. The apparatus of claim 1 wherein a portion of the annular hub is disposed within the annular space.

4. The apparatus of claim 1 wherein the annular hub comprises a first annular hub portion and a second annular hub portion, and wherein the first annular hub portion and the second annular hub portion are detachably connected together around the mandrel such that the annular hub is rotatable around the mandrel.

5. The apparatus of claim 1 wherein each wheel comprises a spherical cap geometry.

6. The apparatus of claim 1 wherein the downhole tool further comprises a plurality of cylindrical members connected to the annular hub, and wherein each wheel is connected to the annular hub via a corresponding one of the cylindrical members.

7. The apparatus of claim 1 wherein:
   each wheel is rotatable about a corresponding axis of rotation;
   the annular hub and the wheels are collectively rotatable about a longitudinal axis of the downhole tool; and the axis of rotation of each wheel extends perpendicularly with respect to the longitudinal axis of the downhole tool.

8. The apparatus of claim 7 wherein the lip is configured to restrain axial movement of each wheel along a corresponding axis of rotation thereby preventing each wheel from disconnecting from the annular hub.

9. The apparatus of claim 7 wherein the lip extends from the connector portion axially along the longitudinal axis of the downhole tool.

10. The apparatus of claim 1 wherein the portion of the outer edge of each wheel moves circumferentially along the annular space when the annular hub and the wheels collectively rotate around the mandrel.

11. The apparatus of claim 1 wherein:
the connector portion is a first connector portion;
the lip is a first lip;
the annular space is a first annular space;
the portion of the outer edge of each wheel is a first portion of the outer edge of each wheel;
the downhole tool further comprises:
a second connector portion configured for connection to the tool string; and
a second lip extending axially from the second connector portion and circumferentially around the mandrel;
the mandrel and the second lip collectively define a second annular space;
the mandrel is connected to the second connector portion and is located between the first connector portion and the second connector portion;
the first lip and the second lip extend axially toward each other; and
a second portion of the outer edge of each wheel is disposed within the second annular space.

12. The apparatus of claim 1 wherein the wheels are operable to roll along a sidewall of a wellbore to reduce friction between the tool string and the sidewall when the downhole tool is connected to the tool string and the tool string is being conveyed through the wellbore.

13. An apparatus comprising:
a downhole tool comprising:
a connector portion configured for connection to a tool string, wherein the connector portion has an outer diameter;
a mandrel connected to the connector portion, wherein the mandrel has an outer diameter that is smaller than the outer diameter of the connector portion;
a lip extending from the connector portion and around the mandrel;
an annular hub disposed around the mandrel, wherein the annular hub is rotatable around the mandrel; and
a plurality of wheels connected to the annular hub, wherein each wheel is rotatable, wherein the annular hub and the wheels are collectively rotatable around the mandrel, and wherein the lip extends around a portion of an outer edge of each wheel.

14. The apparatus of claim 13 wherein the connector portion comprises a threaded connector configured for connection to the tool string.

15. The apparatus of claim 13 wherein a bore extends longitudinally through the connector portion and the mandrel.

16. The apparatus of claim 13 wherein the lip extends around a portion of the annular hub.

17. The apparatus of claim 13 wherein the annular hub comprises a first annular hub portion and a second annular hub portion, and wherein the first annular hub portion and the second annular hub portion are detachably connected together around the mandrel such that the annular hub is rotatable around the mandrel.

18. The apparatus of claim 13 wherein each wheel comprises a spherical cap geometry.

19. The apparatus of claim 13 wherein the downhole tool further comprises a plurality of cylindrical members connected to the annular hub, and wherein each wheel is connected to the annular hub via a corresponding one of the cylindrical members.

20. The apparatus of claim 13 wherein:
each wheel is rotatable about a corresponding axis of rotation;
the annular hub and the wheels are collectively rotatable about a longitudinal axis of the downhole tool; and
the axis of rotation of each wheel extends perpendicularly with respect to the longitudinal axis of the downhole tool.

21. The apparatus of claim 20 wherein the lip is configured to restrain axial movement of each wheel along a corresponding axis of rotation thereby preventing each wheel from disconnecting from the annular hub.

22. The apparatus of claim 13 wherein the lip extends around the portion of the outer edge of each wheel when the annular hub and the wheels collectively rotate around the mandrel.

23. The apparatus of claim 13 wherein:
the connector portion is a first connector portion;
the lip is a first lip;
the portion of the outer edge of each wheel is a first portion of the outer edge of each wheel;
the downhole tool further comprises:
a second connector portion configured for connection to the tool string; and
a second lip extending from the second connector portion and around the mandrel;
the mandrel is connected to the second connector portion and is located between the first connector portion and the second connector portion;
the first lip and the second lip extend toward each other; and
the second lip extends around a second portion of the outer edge of each wheel.

24. The apparatus of claim 13 wherein the wheels are operable to roll along a sidewall of a wellbore to reduce friction between the tool string and the sidewall when the downhole tool is connected to the tool string and the tool string is being conveyed through the wellbore.

25. An apparatus comprising:
a downhole tool operable to be coupled within a tool string and reduce friction between the tool string and a sidewall of a wellbore when the tool string is being conveyed through the wellbore, wherein the downhole tool comprises:
a first connector portion connectable with a first portion of the tool string;
a second connector portion connectable with a second portion of the tool string;
a mandrel connecting together the first connector portion and the second connector portion, wherein the mandrel comprises an outer diameter that is smaller than outer diameters of the first connector portion and the second connector portion;
a first sleeve extending from the first connector portion and circumferentially around the mandrel, wherein the first connector portion, the mandrel, and the first sleeve collectively define a first annular recess;
a second sleeve extending from the second connector portion and circumferentially around the mandrel, wherein the second connector portion, the mandrel, and the second sleeve collectively define a second annular recess;
an annular hub disposed around the mandrel between the first connector portion and the second connector portion such that the annular hub is rotatable around the mandrel; and
a plurality of wheels each rotatably connected to the annular hub, wherein:
the annular hub and the wheels are collectively rotatable around the mandrel;
a first portion of an outer edge of each wheel is disposed within the first annular recess and moves circumferentially along the first annular recess when the annular hub and the wheels collectively rotate around the mandrel; and
a second portion of the outer edge of each wheel is disposed within the second annular recess and moves circumferentially along the second annular recess when the annular hub and the wheels collectively rotate around the mandrel.

26. The apparatus of claim 25 wherein the first connector portion and the mandrel are integrally formed, and wherein the mandrel and the second connector portion are detachably connected.

27. The apparatus of claim 25 wherein a bore extends longitudinally through the first connector portion, the second connector portion, and the mandrel.

28. The apparatus of claim 25 wherein a first end of the annular hub is disposed within the first annular recess, and wherein a second end of the annular hub is disposed within the second annular recess.

29. The apparatus of claim 25 wherein the annular hub comprises a first annular hub portion and a second annular hub portion, and wherein the first annular hub portion and the second annular hub portion are detachably connected together around the mandrel between the first connector portion and the second connector portion such that the annular hub is rotatable around the mandrel.

30. The apparatus of claim 25 wherein each wheel comprises a spherical cap geometry.

31. The apparatus of claim 25 wherein the downhole tool further comprises a plurality of cylindrical members connected to the annular hub, and wherein each wheel is connected to the annular hub via a corresponding one of the cylindrical members.

32. The apparatus of claim 25 wherein:
each wheel is rotatable about a corresponding axis of rotation;
the annular hub and the wheels are collectively rotatable about a longitudinal axis of the downhole tool; and
the axis of rotation of each wheel extends perpendicularly with respect to the longitudinal axis of the downhole tool.

33. The apparatus of claim 32 wherein the first sleeve and the second sleeve are configured to collectively restrain axial movement of each wheel along a corresponding axis of rotation thereby preventing each wheel from disconnecting from the annular hub.

* * * * *